Figure 1:
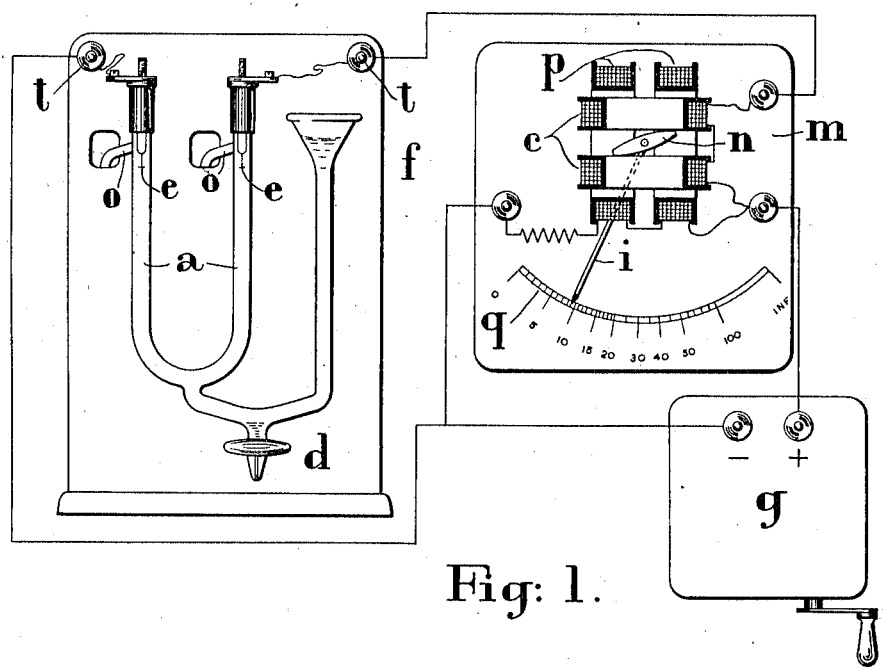

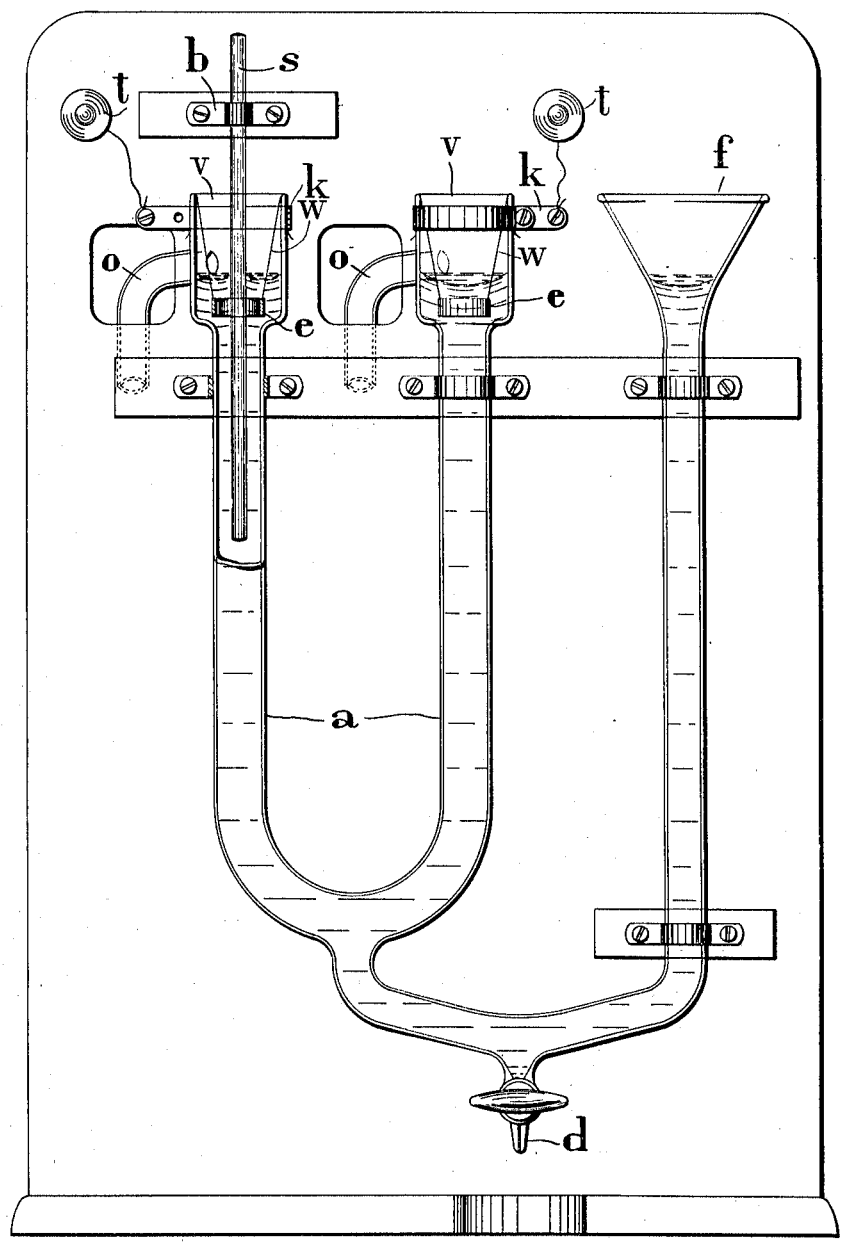

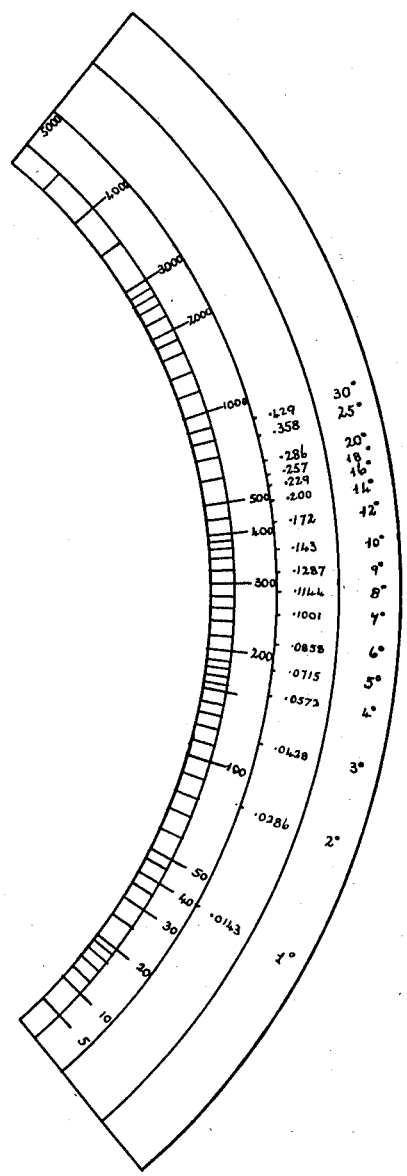
Fig: 5.

UNITED STATES PATENT OFFICE.

WILLIAM POLLARD DIGBY AND CHARLES WILLIAM VAVASOUR BIGGS, OF LONDON, ENGLAND.

METHOD AND APPARATUS FOR DETERMINING THE AMOUNT OF IMPURITIES IN FLUIDS.

993,586. Specification of Letters Patent. Patented May 30, 1911.

Application filed September 11, 1908. Serial No. 452,622.

*To all whom it may concern:*

Be it known that we, WILLIAM POLLARD DIGBY and CHARLES WILLIAM VAVASOUR BIGGS, subjects of the King of Great Britain and Ireland, residing at London, England, have invented new and useful Improvements in Methods and Apparatus for Determining the Amount of Impurities in Fluids, of which the following is a specification.

This invention relates to a method of and apparatus for ascertaining the degree of impurity or proportion of dissolved matter in water and other fluids and is based upon the well known principle that the presence of such impurities or dissolved substances so increases the conductivity of the fluid that the amount of extraneous substance present in a given quantity of fluid may be deduced from the specific resistance of the fluid.

According to our invention the fluid to be treated is contained in a tube of glass, or other suitable material in which two electrodes are fixed at a standard distance for the purpose of passing a current through the fluid in order to test its conductivity or resistance by suitable indicating instruments. We may derive the direct current for our measurements from any known source but in order to eliminate the error which is liable to be caused by the back electromotive force of decomposition we employ a source which yields the required current at a sufficiently high pressure to render the effect of the back electromotive force practically negligible. For convenience we prefer to use a small hand dynamo or magneto electric machine adapted to generate a direct current at the required pressure. For most purposes we find it convenient to use any pressure from 50 volts to 200 volts.

To eliminate the spurious resistance which may be caused by the accumulation of gas or other products of decomposition upon the surface of the electrodes consequent upon the decomposition of the fluid, we use one or other of the following means either alone or in conjunction, that is to say in the first place we use as small a testing current as is compatible with the effective working of the indicating instruments so that the quantity of gas or other products evolved is reduced as much as possible. Next we make our conductivity tube of such proportions as regards length and area as will give a large resistance compared with that offered by those parts of the path of the current which immediately surround the electrodes. And finally we so construct our conductivity tube and its electrodes as to facilitate the escape of the gas as it is formed, either by the use of electrodes made of an open network of fine wires or having a platinized or roughed surface or other equivalent, or by causing the fluid to flow continuously into and out of the tube by suitable inlet and outlet pipes adapted to cause the moving fluid to impinge upon the electrodes and wash the gas off them. Whichever means we use for facilitating the escape of the gases and other products we so dispose the various parts as to prevent the products of decomposition from traveling into that part of the tube which forms the path of the current between the electrodes, and to insure their discharge through overflow or outlet pipes.

We may use any known means for indicating or measuring the conductivity or resistance of the fluid in our tube, but in our preferable arrangement we use an ohmmeter with a scale so calibrated as to give a direct indication proportional to the amount of impurity or dissolved substance present in the fluid under test; or to give a direct reading of the resistance of the fluid from which the proportion of extraneous matter may be deduced.

It is essential that the results of tests made by our method and apparatus should be comparable with some fixed standard and for that purpose we provide means for adjusting the ratio of the length to the area of the path of the current between the two electrodes in the tube. We effect this by making one or both of the electrodes adjustable to and fro along the length of the tube. The effective length of the path of the current may then be initially adjusted to some convenient standard by sliding or screwing the electrodes which are thereafter permanently fixed in the ascertained position. Or alternatively we may have our electrodes fixed and not adjustable and we may alter the effective area of the path of the current by inserting a rod or tube of insulating material inside our conductivity tube. The effective ratio of length to area may then be adjusted by sliding the inserted rod to and fro in the conductivity tube so as to contract the effective area over a greater or less proportion of the whole length of the path between the electrodes. When the conductivity tube has been standardized in this way the inserted rod is permanently fixed in the ascertained position. We then cause the fluid to pass continuously through our tube by means of suitable inlet and outlet pipes.

In order that our invention may be better understood we will now describe it with reference to the accompanying drawings of which:—

Figure 3:
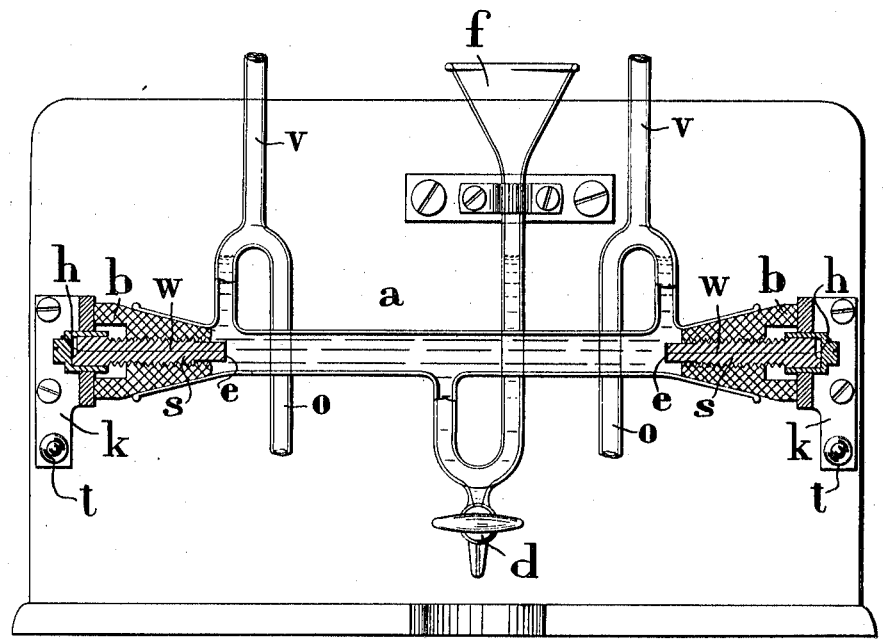
Figure 2:
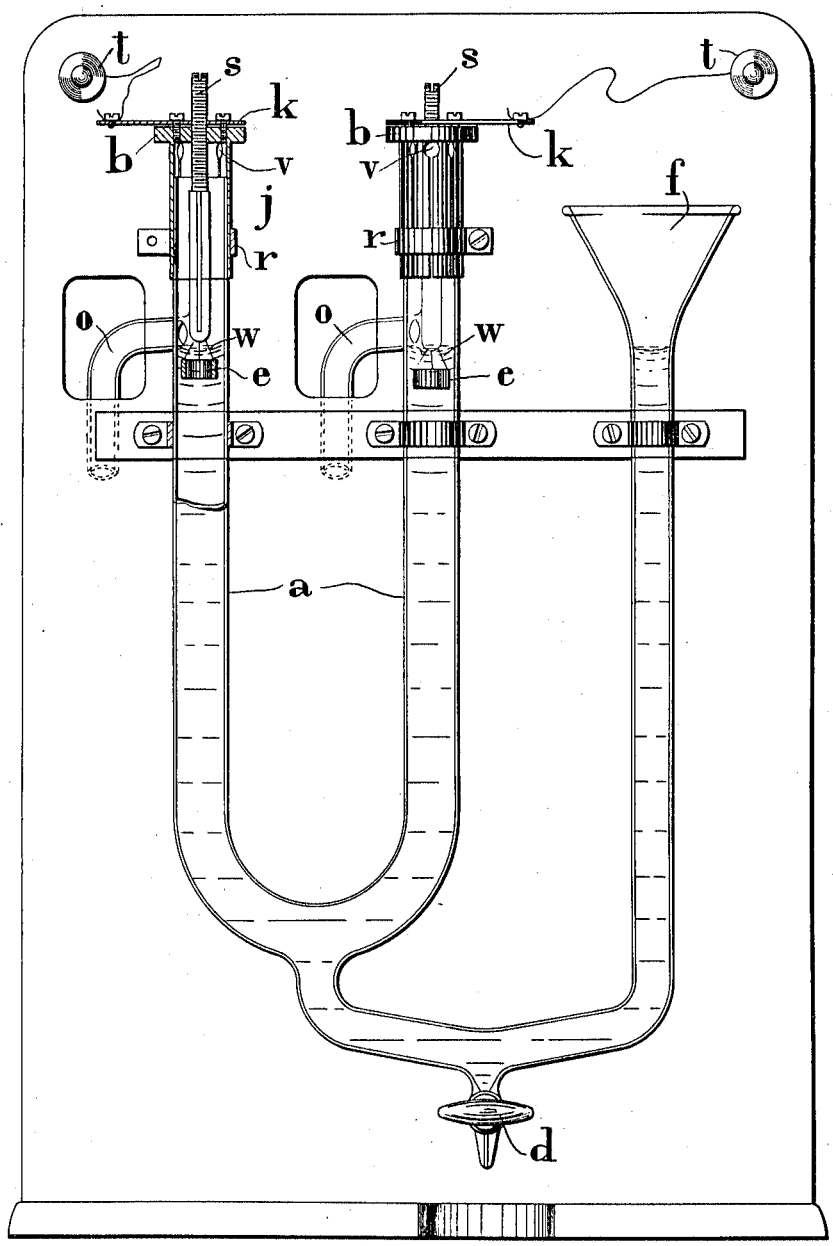

Figure 1 illustrates our method and apparatus for testing liquids. Fig. 2 shows our conductivity tube in detail. Fig. 3 is a modification of the same. Fig. 4 is another modification of our tube. Fig. 5 shows the scale for indicating the amount of calcium carbonate in solution as acid carbonate in conjunction with Clark's scale of hardness, and a scale of reciprocals.

In the drawings like letters refer to similar parts.

In Fig. 1 $a$ is a glass tube containing the fluid under test, $m$ is an indicator of conductivity, and $g$ is a small continuous current hand dynamo wound to give from 50 to 200 volts at convenient speeds of the handle. As a suitable form of conductivity indicator we show an ohmmeter with a scale calibrated to read in units of conductance. The current generated by the dynamo is led through the current coils $c$ of the ohmmeter to one of the terminals $t$ which is connected to one of the adjustable electrodes $e$. The current then passes through the liquid in the tubes $a$ to the other electrode $e$ and thence by the other terminal $t$ back to the dynamo. The pressure coils $p$ of the ohmmeter are connected across the terminals of the dynamo in the ordinary way. The liquid is passed into the conductivity tube by means of the inlet or funnel $f$ and it may be caused to pass continuously through the tube, if required, by allowing it to flow out of the overflow or outlet pipes $o$ $o$. The conductivity tube may be emptied by means of the drain cock $d$.

We so proportion the tube $a$ that the length from one electrode to the other is ten times or one hundred times the sectional area of the tube (or some other convenient multiple of the area) so that the specific conductivity of the liquid under test may be readily ascertained by measuring the conductance of the tube and multiplying it by the constant ten or hundred.

To provide for the unavoidable errors in the proportion of the tube $a$, we make the electrodes $e$ $e$ adjustable up and down the tube, and we then standardize the tube to an exact constant by filling it with a standard fluid of known conductivity and adjusting the electrodes until the conductance between the electrodes has the correct value. We find a solution of sodium chlorid in distilled water makes a convenient liquid of standard conductivity but we may use other liquids for the purpose.

The indication $m$ may be calibrated to read direct in units of conductivity when used in conjunction with a tube standardized to have a particular ratio of length to area, or we may calibrate it to read in units of conductance so that it may be used with any tube, and the conductivity of the fluid is then determined by multiplying the reading of the indicator by the constant of the particular tube. In Fig. 1 we show the needle $n$ of the indicator deflected by the current flowing in the current coils $c$ so that the index $i$ stands at a reading upon the scale $q$, indicating the conductance of the tube $a$.

The indication may be made in terms of percentage composition of any particular ingredient, and in Fig. 5 it will be seen that this is shown with regard to calcium carbonate in relation to Clark's scale of hardness, the outer scale being Clark's, while the middle scale shows the grams per liter of calcuim carbonate in solution as acid carbonate, and the inner scale shows reciprocal megohms.

When our method is to be used for detecting the presence of some particular substance with which a water supply is liable to be contaminated, we may calibrate the scale of our indicator to give a direct reading of the actual quantity of the substance present in the water in parts per million, or other convenient units. For example when sea water is used for cooling a surface condenser, our apparatus may be used to determine the conductivity of the condensed water; and in that case our indicator may be calibrated to give a direct reading of the quantity of sea salt present in the condensed water, so that not only is the fact of a leak in the condenser made apparent by our apparatus, but the actual amount of leakage is indicated by the test.

In Fig. 2 we show our adjustable electrodes in detail. The electrode $e$ is a short tube of platinum foil supported by platinum wires $w$ which are attached to and in electrical contact with the lower end of a brass rod $s$. The lower part of the rod $s$ is covered by a glass tube $j$ into which the wires $w$ are sealed, so that the liquid in the tube $a$ is not brought into contact with any other substances besides glass and platinum. The rod $s$ is screwed through the brass cap $b$ and can be clamped in position by means of the lock-nut plate $k$. The brass cap $b$ is made as flexible as possible and is adapted to slide upon the outside of the tube $a$, a clamping ring r being provided for the purpose of fixing the cap in any required position. The position of the electrode e may then be roughly adjusted by sliding the cap b up or down and the final adjustment may be made by means of the screwed rod s. Vents for the escape of gas are provided by the holes and slits v v.

In Fig. 3 we show a modification of our tube in which the ends of the tube a are formed into cones and closed by conical plugs b b of ebonite or other suitable insulating material. Each electrode e is fixed upon the ends of a screwed rod s of ebonite or other suitable material which is screwed through the plug b. The outer end of the rod s is securely fixed in a brass head h by means of which the rod and its attached electrode may be screwed to and fro for purpose of adjustment. The rod s with its brass head h is supported in the brass cock piece k on which is a terminal t. Connection between the electrode e and the terminal t is established by means of a platinum wire w which is riveted to the electrode e at one end and to the brass head h at the other. With this form of tube we provide vent pipes v v to prevent any tendency which the outlet pipes o o may have to syphon the liquid out of the tube, and also to facilitate the escape of any gas passing away from the electrodes.

In Fig. 4 we show an alternative method for adjusting the ratio of the length to the area of our tube by means of a glass rod s which can be adjusted down or up the tube a and so diminish the sectional area of the liquid in the tube over a greater or less proportion of the whole of its length. The glass rod s can be fixed in any required position by means of the cleat b. With this form of adjustment the electrodes are fixed in position by hooking the supporting wires w w over the ends of the tube a and securely fixing them in place by means of the clamping rings k k. To provide ample space for the adjusting rod s we enlarge the ends of the tube a so as to permit the use of tubular electrodes e e of large diameter. The tube a is left open at each end for the escape of gas.

What we claim as our invention and desire to secure by Letters Patent is:—

1. The method of detecting the presence and estimating the quantities of impurities and dissolved matter in water and other fluids, consisting in applying a potential difference of from 50 to 200 volts to the fluid, passing in a continuous stream through a container so constructed and arranged with respect to the points of application of the potential difference that the path of the current generated from the applied potential difference has a large ratio of length to cross-sectional area, the passage of the fluid serving to wash the vessel and electrodes contained therein and prevent gaseous matter liberated at the electrodes from traversing the portion of the liquid forming the direct path of the current between the electrodes and obtaining the amount of the impurity by measuring the value of conductance of the fluid under test in terms of that of a standard fluid, substantially as described.

2. An apparatus for the detection and estimation of impurities and dissolved matter in water and other fluids, comprising a conductivity tube having electrodes, an inlet pipe, outlet pipe, and vents for the escape of gas adapted to prevent the gas remaining in the path of the current, means for adjusting the ratio of the effective length to area of the path of the current through the fluid, a direct reading indicator of conductance or conductivity, a source of electrical energy, and circuit connections between said electrodes, said indicator and said source of electrical energy, substantially as described.

In testimony whereof we have signed our names to this specification in the presence of two subscribing witnesses.

WILLIAM POLLARD DIGBY.
CHARLES WILLIAM VAVASOUR BIGGS.

Witnesses:
RICHARD A. HOFFMANN,
CHARLES CARTER.